US012645820B2

(12) United States Patent
Cobb et al.

(10) Patent No.: US 12,645,820 B2
(45) Date of Patent: *Jun. 2, 2026

(54) MACHINE LEARNING FOR IDENTITY ACCESS MANAGEMENT

(71) Applicant: SoftWarfare, LLC, Shawnee, KS (US)

(72) Inventors: Wyatt O'Neill Cobb, Mission Hills, KS (US); Zachary Lewis Jovic Misic, Overland Park, KS (US)

(73) Assignee: SoftWarfare, LLC, Prairie Village, KS (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/403,093

(22) Filed: Jan. 3, 2024

(65) Prior Publication Data

US 2024/0135019 A1 Apr. 25, 2024

Related U.S. Application Data

(63) Continuation of application No. 17/961,515, filed on Oct. 6, 2022, now Pat. No. 11,899,808, which is a continuation of application No. 16/696,257, filed on Nov. 26, 2019, now Pat. No. 11,494,507.

(51) Int. Cl.
| | |
|---|---|
| *G06F 21/62* | (2013.01) |
| *G06F 21/55* | (2013.01) |
| *G06N 3/04* | (2023.01) |
| *G06N 3/084* | (2023.01) |
| *H04L 9/40* | (2022.01) |
| *G06Q 50/26* | (2012.01) |

(52) U.S. Cl.
CPC ........ G06F 21/6218 (2013.01); G06F 21/554 (2013.01); G06N 3/04 (2013.01); G06N 3/084 (2013.01); H04L 63/0861 (2013.01); H04L 63/14 (2013.01); G06Q 50/265 (2013.01)

(58) Field of Classification Search
None
See application file for complete search history.

(56) References Cited

U.S. PATENT DOCUMENTS

| | | | | |
|---|---|---|---|---|
| 11,062,315 B2 * | 7/2021 | Noble | .................... | G06Q 30/06 |
| 2017/0364918 A1 * | 12/2017 | Malhotra | ............. | G06Q 20/204 |
| 2018/0288073 A1 * | 10/2018 | Hopper | ............... | H04L 63/1425 |
| 2019/0220863 A1 * | 7/2019 | Novick | .................. | G06Q 20/10 |

* cited by examiner

*Primary Examiner* — William J. Goodchild
(74) *Attorney, Agent, or Firm* — Erise IP, P.A.

(57) ABSTRACT

A computer readable medium, a system, and a method for providing data security through identity access management using a transaction classifier to classify transactions according to a set of transaction data associated with the transaction and mitigate abnormal transactions. The transaction classifier is trained using a set of training data and updated after each transaction. The identity access management may also include a mitigation policy that is used to determine a mitigation technique for each transaction.

20 Claims, 5 Drawing Sheets

500

502 ESTABLISH INPUT NODES

504 CONSTRUCT HIDDEN LAYERS

506 ESTABLISH OUTPUT NODES

508 BUILD CONNECTIONS

510 TRAIN THE NETWORK

512 STORE DATA

MACHINE LEARNING FOR IDENTITY ACCESS MANAGEMENT

CROSS-REFERENCE TO RELATED APPLICATIONS

This application is a continuation application claiming priority benefit, with regard to all common subject matter, of U.S. patent application Ser. No. 17/961,515, filed Oct. 6, 2022, and entitled "MACHINE LEARNING FOR IDEN-TITY ACCESS MANAGEMENT" ("the '515 Application"). The '515 Application is a continuation application claiming priority benefit, with regard to all common subject matter, of U.S. patent application Ser. No. 16/696,257, filed Nov. 26, 2019, and entitled "MACHINE LEARNING FOR IDENTITY ACCESS MANAGEMENT," now U.S. Pat. No. 11,494,507. The identified earlier-filed application and pat-ent are hereby incorporated by reference in their entirety into the present application.

BACKGROUND

1. Field

Embodiments of the invention relate generally to data security and, more specifically, relate to providing data security using an identity access management system.

2. Related Art

Current data systems for companies and entities that comprise numerous users rely on a plurality of databases and programs to store user information, authenticate users, authorize user access, and perform various identity data functions. Each of the above-mentioned functions may be performed by a separate program using data from a respec-tive database. As such, the processes for storing user infor-mation, authenticating a user, and authorizing user access are not streamlined to a singular program or collective database and in some cases, create an increased workload for IT professionals.

Further, current data security systems rely on security policy to carry out security operations. The security policy is static and requires additional input from security person-nel to operate effectively. There is a need for a dynamic data security system for which security policy can be updated automatically.

SUMMARY

Embodiments of the invention solve the above-mentioned problems by providing a system and method to provide identity access management using machine learning tech-niques to identify and mitigate potential threats, authenticate users, determine user account access, and store user infor-mation. In some embodiments, the system uses a backpropa-gation technique within an artificial neural network algo-rithm to classify transactions as either normal or abnormal.

A first embodiment of the invention is directed one or more non-transitory computer readable storage media stor-ing computer-executable instructions that, when executed by a processor, perform a method of providing identity access management, the method comprising the steps of: receiving training data, from a training database, wherein the training data comprises historical transaction data, training a trans-action classifier using the training data, receiving transaction data for a pending transaction from at least one of an authentication database, an authorization database, and an identity database, wherein the pending transaction is asso-ciated with a user account, classifying the pending transac-tion as either normal or abnormal, using the transaction classifier and based on the received transaction data, if the pending transaction is classified as normal, allowing the pending transaction to proceed and determining an authori-zation privilege of the user account according to the trans-action data, if the pending transaction is classified as abnor-mal, mitigating the pending transaction according to a mitigation policy, updating the transaction classifier in real-time based on the transaction data and the classification of the transaction, and updating the mitigation policy in real-time based on the transaction data and the classification of the transaction.

A second embodiment of the invention is directed to an identity access management system for providing user authentication and access authorization comprising: an authentication database, an identity database, an authoriza-tion database, an identity access management database bidi-rectionally connected to the authentication database, the identity database, and the authorization database, a proces-sor programmed to perform a transaction classification method using an artificial neural network algorithm, the method comprising the steps of: receiving training data, from a training database, wherein the training data com-prises access control policy, subject attributes, and environ-mental attributes, training the artificial neural network algo-rithm using the training data, receiving transaction data for a pending transaction from at least one of the authentication database, the identity database, and the authorization data-base, wherein the pending transaction is associated with a user account, classifying the pending transaction as either normal or abnormal, using the transaction classifier and based on the received transaction data, if the pending transaction is classified as abnormal, mitigating the pending transaction according to a mitigation policy, updating the transaction classifier in real-time based on the transaction data and the classification of the transaction, and updating the mitigation policy in real-time based on the transaction data and the classification of the transaction.

A third embodiment of the invention is directed to a method for providing identity access management, the method comprising the steps of: receiving training data, from a training database, wherein the training data com-prises access control policy, subject attributes, and environ-mental attributes, training an artificial neural network-based transaction classifier using the training data, receiving trans-action data for a pending transaction from at least one of an authentication database, an authorization database, and an identity database, wherein the pending transaction is asso-ciated a user account, classifying the pending transaction as either normal or abnormal, using the artificial neural net-work-based transaction classifier and based on the received transaction data, if the pending transaction is classified as normal, allowing the pending transaction to proceed, if the pending transaction is classified as abnormal, mitigating the pending transaction according to a mitigation policy, updat-ing the artificial neural network-based transaction classifier in real-time based on the transaction data and the classifi-cation of the transaction, and updating the mitigation policy in real-time based on the transaction data and the classifi-cation of the transaction.

Additional embodiments of the invention are directed to a method for providing identity access management by using training data and transaction data to train a machine learning algorithm to determine normal user data. Values associated with the normal user data may be dynamically stored and updated. The machine learning algorithm is programmed to identify activity that falls outside of a threshold of normality associated with the normal user data. Activity that falls outside of the threshold of normality may be mitigated to prevent malicious user activity.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
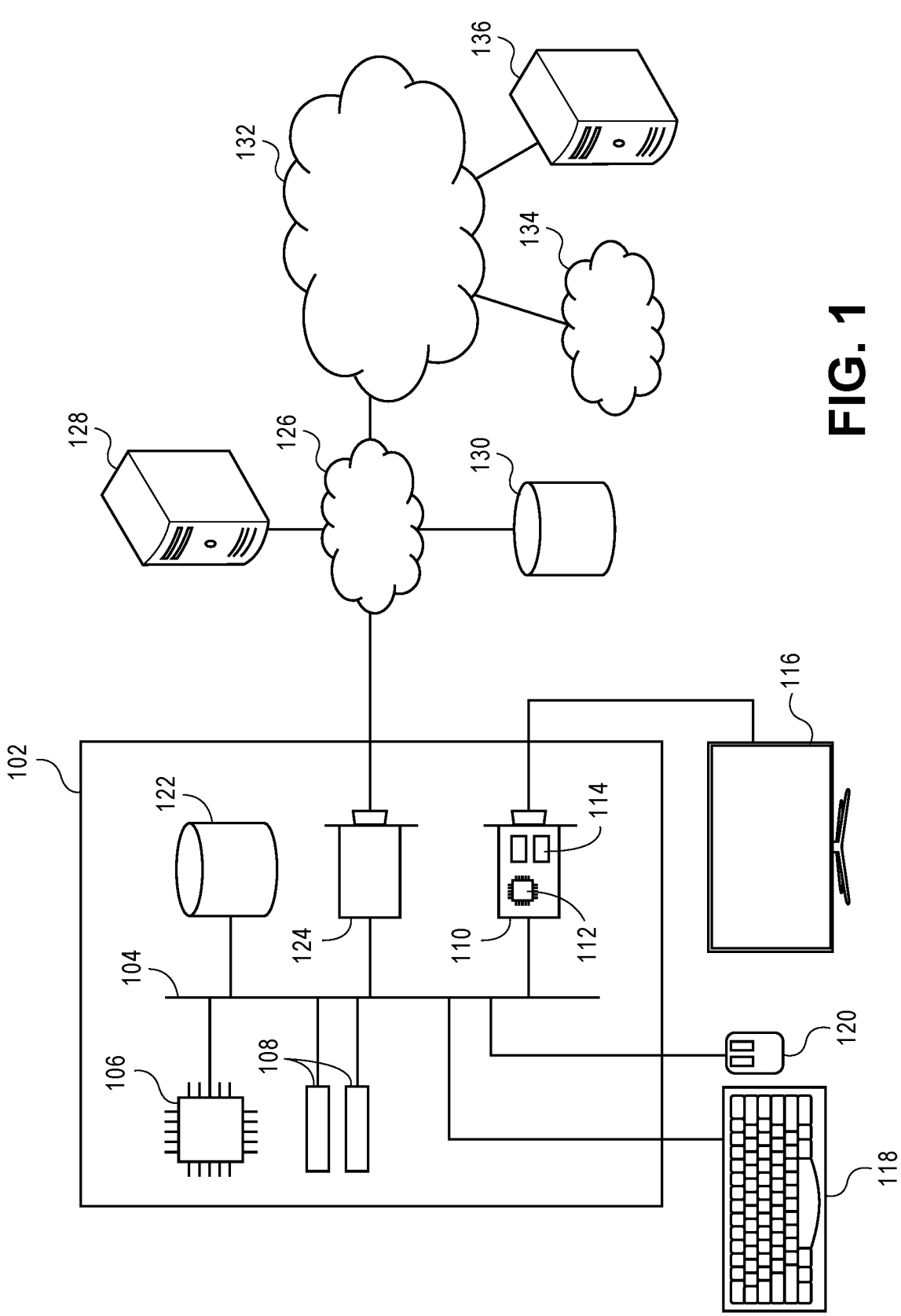
FIG. 1 depicts an exemplary hardware platform used by some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a recording device manager, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Additionally, any number of sensors (not shown) such as a biometric sensor discussed below may also be connected to system bus 104. Like display 116, these peripherals may be integrated into computer 102 or absent. Also, connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In certain embodiments, computer 102 can itself be directly connected to Internet 132. In some embodiments, the system depicted in FIG. 1 may be connected to a web-based application platform and run applications through the web-based platform or may provide the web-based platform to other computers to run applications, manage workflows, and store and manage data.

Figure 2:
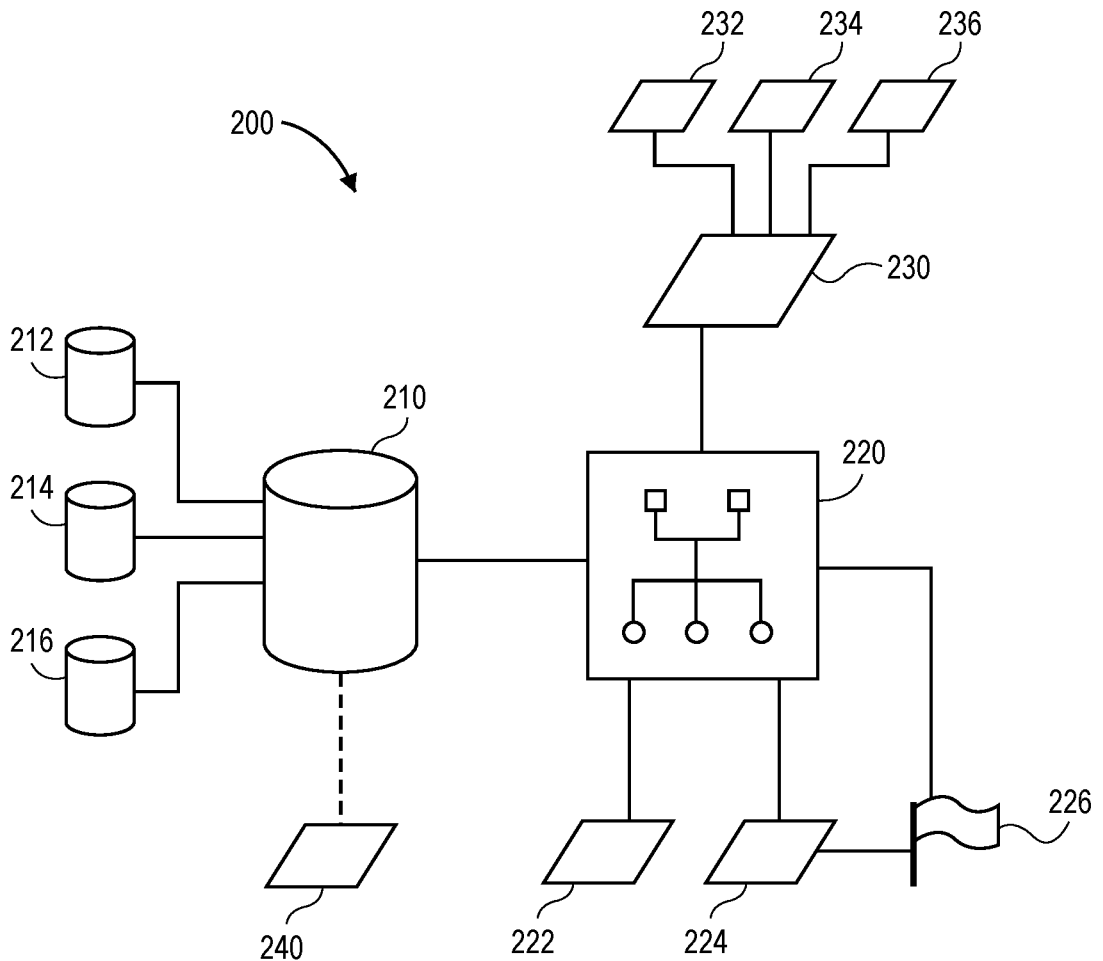
FIG. 2 is an exemplary block diagram depicting an Identity Access Management system.

FIG. 2 depicts an exemplary block diagram of an identity access management system 200. An identity access management database 210 communicates with a plurality of connector databases. The plurality of connector databases may include a first database 212, a second database 214, and a third database 216. The communication between the connector databases and the identity access management database 210 may be through a connection, which in some embodiments, may be an internet connection, such as network 126. In some embodiments, the information communicated between the identity access management database and the connector databases may be encrypted to enhance security. The identity access management database 210 may store at least a portion of the information received from the connector databases or may otherwise actively communicate with the connector databases to access information. First database 212, second database 214, third database 216 and identity access management database 210 may be separate databases stored on separate systems different databases stored on the same system or different components of the same database stored on a single system (or split across multiple systems).

The first database 212 may be a multi-factor authentication database. The multi-factor authentication database may store information related to authenticating user account information of a user account, such as usernames, passwords, fingerprint scans, voice data, iris data, face data, response rates, input patterns, and other authentication information. Authentication of a user may require two or more factors to authenticate the user account, which may be related to knowledge of the user, possession of the user, or inherence of the user. An example of a factor relating to knowledge of the user is a password that only the user knows. Similarly, a user's PIN, and answers to secret questions and/or out-of-wallet questions are also examples of knowledge factors. An example of a factor relating to possession of the user would be an ID card that only the user owns. Similarly, a fob that generates one-time keys or a user's cell phone (to receive SMS messages) are examples of possession factors. An example of a factor relating to an inherence of the user is a fingerprint of the user that is exclusive only to the user. Other inherent factors include the user's face, voice, hand geometry, retina, iris, and other biometrics. In some embodiments, two-factor authentication may be used, wherein a combination of two factors are used to authenticate the user account. Two-factor authentication may rely on any two of the above-mentioned factors or any other factors relating to the user. In other embodiments, three-factor (or any number of factors) may be used for authentication. In some embodiments, the information communicated from the multi-factor authentication database and the identity access management database 210 may include failed and successful attempts at authentication, device and configuration changes, user lists, and location information in addition to stored user credentials for any authentication factor. In some embodiments, the authentication subsystem may receive biometric data from a biometric sensor interfaced with a user device. The biometric sensor may be connected to system bus 104, and may be any of a facial recognition device, fingerprint scanner, hand geometry scanner, retinal scanner, iris scanner, and microphone. This data may be compared to the corresponding credential stored in database 212. In some embodiments, other sensors may be used like magnetic sensors, or barcode readers. In some embodiments, biometric sensors, magnetic sensors, or barcode readers may be used to gather transaction data that may be used to authenticate a user.

The second database 214 may be an identity governance database. The identity governance database is an identity database that handles the associations of users, user accounts, devices, and digital resources for the identity governance subsystem. The identity database may store data indicative of what resources a particular user account should have access to, or what devices should have access to said resources. In some embodiments, the information communicated from the identity database may include denials of access, user behavior/user activities, background task results, and access requests. In some embodiments, the identity database stores user information relating to the user account and may be used to track activity of a specific user account. In some embodiments, information from the identity database may be used to identify normal user activity and a set of normal data associated with normal user activity.

The third database 216 may be a privileged access management database. The privileged access management database may be an authorization database and may further have a function of logging transactions. Privileged access management may be used to manage access to certain assets. In some embodiments, the privileged access management may be implemented by securing the credentials of certain privileged accounts within a secure repository. The secure repository may be a vault that is a secure memory storage device. The vault must receive proper authentication before using the credentials. In certain embodiments, the credentials are never used outside of the secure repository as to never run in an executable script of any other source, so the credentials may not be stolen. In some embodiments, the information communicated from the privileged access management database to the identity access management database 210 may include failed login attempts, user provisioning and deprovisioning, denials of access, and location. In some embodiments, database 216 may interact with a directory subsystem, such as LDAP or Active Directory to determine user privileges.

In some embodiments, the plurality of connector databases may simultaneously communicate with the identity access management database 210. The connection between the connector databases and the identity access management database may be bidirectional as to allow the identity access management database 210 to both receive information from the connector databases and send information to the connector databases. In some embodiments, the identity access management database 210 can communicate information to the plurality of connector databases simultaneously or just to one or more of the connector databases at a time. For example, when user information is updated, the identity access management database 210 may communicate with the plurality of connector databases to update the user information in each of the connector databases.

The information in identity access management database 210 may be used by machine learning algorithm 220. In some embodiments, the machine learning algorithm 220 may be an executable program stored within the identity access management database 210 in a memory storage component. In some embodiments, the machine learning algorithm 220 may be stored on one of GPU memory 114, local storage 122, and data store 130. The machine learning algorithm 220 is connected to a training database 230 that in some embodiments may comprise access control policy data 232, subject attributes data 234, and environmental attributes data 236. Additionally, the training database 230 may comprise any form of historical training data, such as, for example, past transaction data. In some embodiments, training database 230 may not be a single database but a collection of training data from various sources.

In some embodiments, the training database 230 may include a set of security scenarios with situational parameters that may be associated with historical transactions. The security scenarios may be fed to the machine learning algorithm 220 to train the machine learning algorithm 220. The security scenarios may include past hacking attempts, such as, for example, a malicious user trying to steal information from a database, a malicious user trying to login to a user account that does not belong to the malicious user, and a non-human entity attempting to guess a user password. Training database 230 may also include a representative sample (or all) of historical (normal) transactions as a basis for classification.

Figure 4:
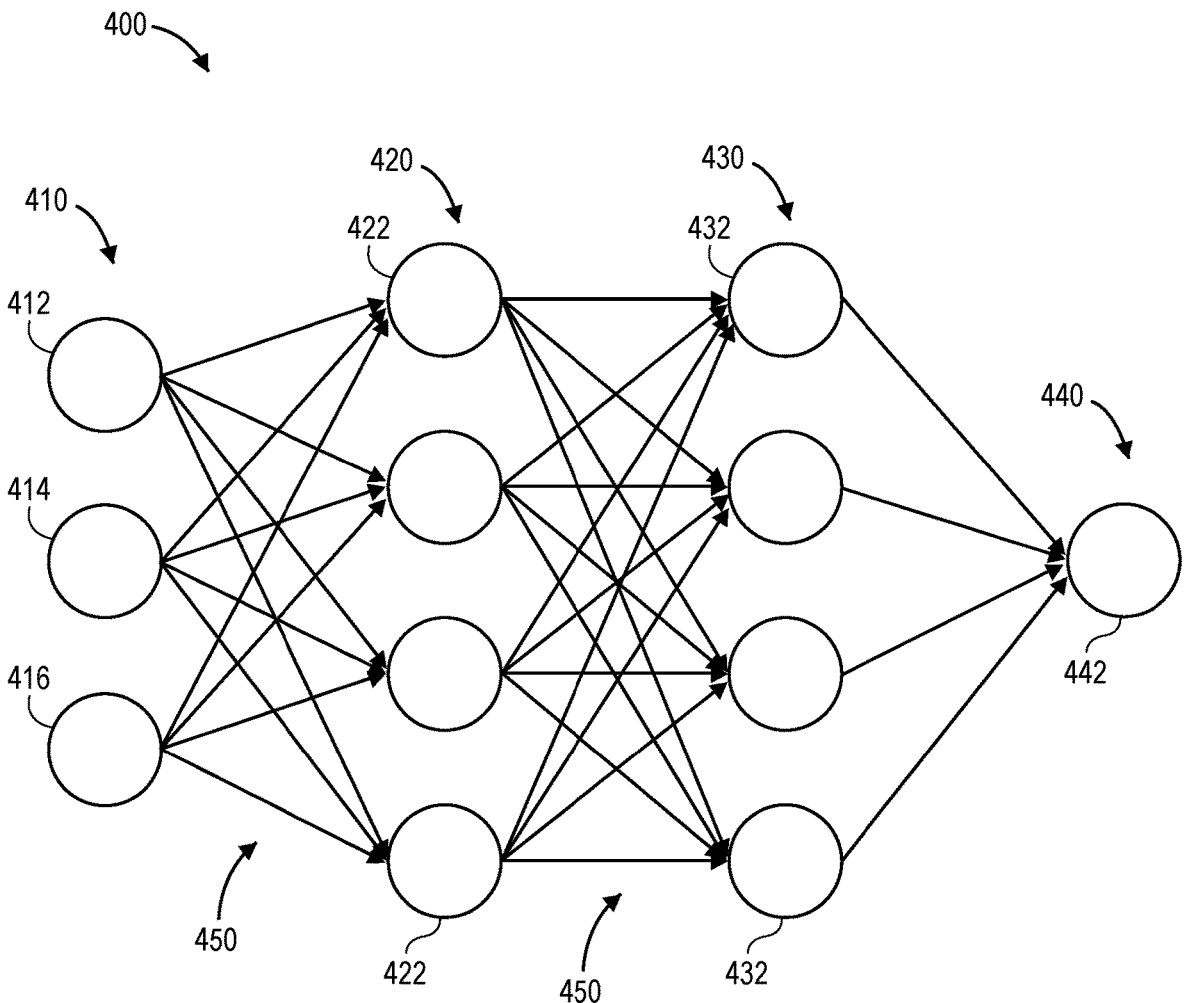
FIG. 4 is a diagram depicting an exemplary artificial neural network algorithm used by some embodiments of the invention.

Machine learning algorithm 220 is programmed to classify a set of transaction data as either normal transaction data 222 or abnormal transaction data 224 using a transaction classifier that is trained with training data received from the training database 230. In some embodiments, the machine learning algorithm 220 may be a neural network algorithm, such as artificial neural network algorithm 400, as shown in FIG. 4. In some embodiments, the abnormal transaction 224 may be flagged with a flag 226 to indicate that the transaction is associated with transaction data that is abnormal and may require some form of mitigation. In some embodiments, the flag 226 may be a transaction ticket including threat information related to the abnormal transaction data 224. For example, the transaction ticket may then be displayed on a user interface of a security administrator to notify the administrator and allow them to take additional actions if needed. In some embodiments, transactions associated with abnormal transaction data 224 may be mitigated further according to a mitigation policy. The mitigation of the transaction may be at least one of a plurality of mitigation techniques such as, for example, flagging a user account, locking a user account, requiring further authentication or any other mitigation techniques. Additional mitigation techniques will be discussed below.

The transactions described herein may be any form of access to any resource associated with the identity access management database 210, such as, for example, a login attempt, a request to access a file, a data entry, and uploading a file. Further, the transactions may be categorized into various transaction types. In some embodiments, the transaction type may be determined based on the transaction data. For example, the transaction type may be determined based at least in part on an access level of the user account. As such, a transaction may be classified as a high level transaction type if the transaction is associated with an administrator level user account. Further, the transaction type may also be based on an operation associated with the transaction. For example, if a user is performing a low-risk task the transaction may be considered a low level transaction type.

In some embodiments of the invention, various forms of machine learning may be used to classify the received transaction. Machine learning techniques may include various mathematical models, such as, for example, linear regression, logistic regression, and backpropagated or forward propagated neural networks. Other types of machine learning models are also contemplated, including clustering algorithms, random forests, Bayesian classifiers, decision trees, k-nearest neighbors, and principal component analysis, as well as many others. Some embodiments may use a combination of mathematical models to enhance threat detection capabilities. Additionally, some embodiments may use a different mathematical model for different types of transactions, or for various functions. For instance, one mathematical model may be used to classify login transactions, while another mathematical model is used to classify authorization transactions, and yet another mathematical model is used to update security and mitigation policy.

In embodiments that utilize a linear regression mathematical model, a single input variable may be used to determine a single output variable. Such embodiments may use training data to train the model in order to adjust constants within the model. Linear regression may be used to find a corresponding threat level associated with each input variable, wherein the input variables are associated with information in the transaction data of a pending transaction. The model may determine a threat level of each input variable and use the threat levels to determine an overall threat level for the transaction.

In embodiments that utilize a logistic regression mathematical model, discrete outcomes may be predicted using coefficients that are adjusted using the training data. The coefficients are used to model a decision-making process to determine whether a threat is present in the transaction data.

In embodiments that utilize a neural network-based mathematical model, a backpropagation algorithm may perform learning on a multilayer feed-forward neural network. In some such embodiments, the neural network is trained using the training data to determine input-output mapping. In such embodiment, to minimize error, the weights of connections between nodes may be modified output-backward. After initiating weight values and inputting training data, the actual output value is compared with the neural network value to determine a numerical error. The numerical error is propagated backwards to update the weights and biases to better fit the actual output value. The weight values may be updated according to a learning rate, which determines the step size of a gradient descent search. A large value for the learning rate enables backpropagation to move faster to a target weight configuration but also increases the chance of the target weight configuration never being reached.

Figure 3:
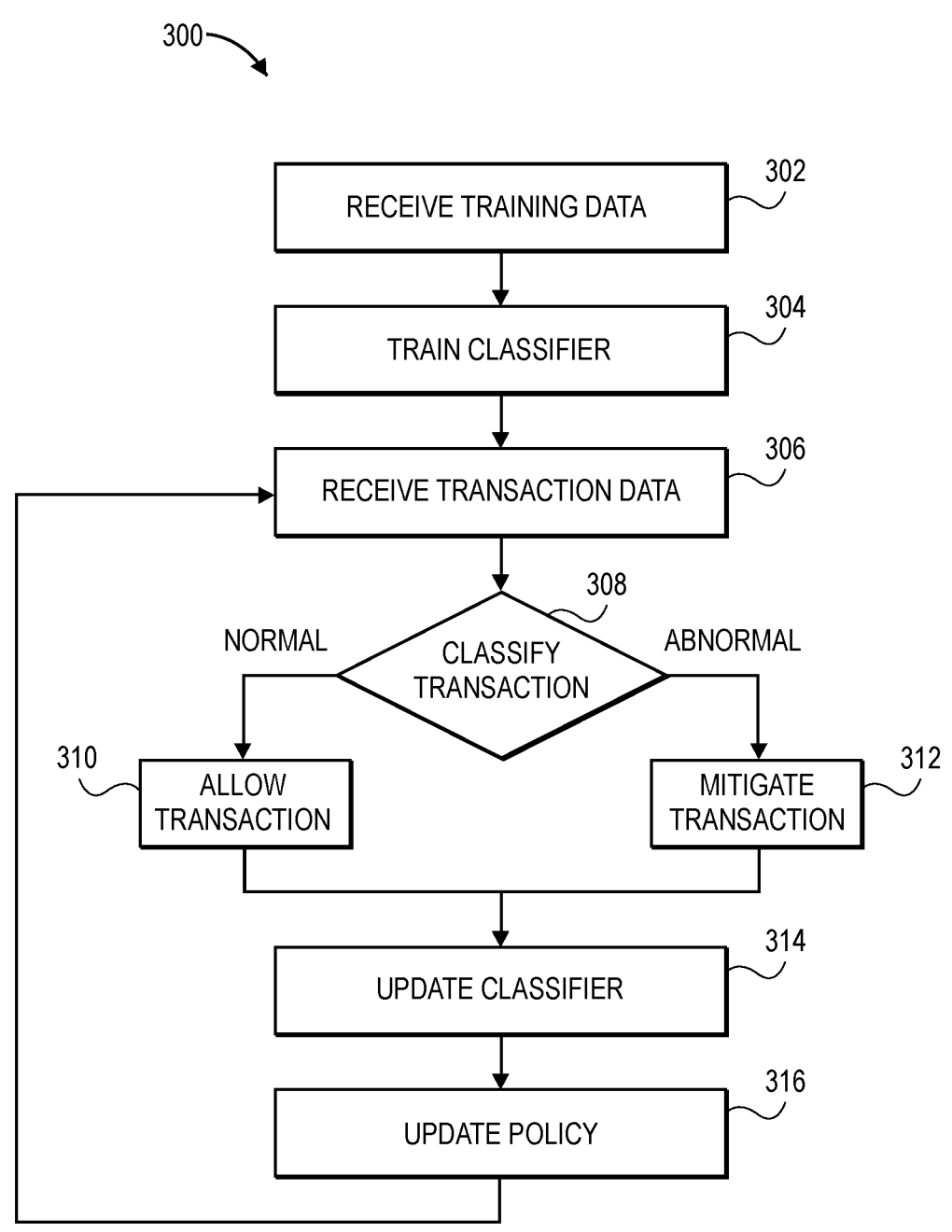
FIG. 3 is an exemplary flow diagram depicting an identity access management process carried out by some embodiments of the invention.

FIG. 3 shows an exemplary flow diagram of an identity access management process 300 that may be implemented by some embodiments of the invention. These embodiments involve training a transaction classifier to classify transactions as either normal or abnormal to increase data security and mitigate potential threats.

At step 302, training data 230 is received. In some embodiments, the training data 230 may be a collection of historical transaction data from various data stores or a single data store and may include automatic or manual classification of whether each transaction is normal or abnormal. In some embodiments the training data 230 may comprise a plurality of data types, which for some such embodiments may be access control policy data 232, subject attributes data 234, environmental attributes data 236, and other data. The training data 230 may be received into a training database, an algorithm, or a transaction classifier.

At step 304, the received training data 230 is used to train a transaction classifier. The transaction classifier may be machine learning algorithm 220. In some embodiments, the transaction classifier may use a backpropagation technique within an artificial neural network algorithm 400 as shown in FIG. 4. In such embodiments, the training data 230 may be used by the artificial neural network algorithm 400 to adjust weights between nodes within the artificial neural network algorithm 400.

At step 306, transaction data is received by the transaction classifier. In some embodiments, the transaction data may be received from at least one of an authentication database, an identity database, and an authorization database. In some embodiments, the authentication database, identity database, and authorization database may be the first database 212, second database 214, and third database 216, respectively. The transaction data is associated with a pending transaction, which in some embodiments may be a login attempt to a user account, creation of a new user account, attempt to access a resource, a password change, or removal of a user account. In embodiments that utilize backpropagation techniques within artificial neural network algorithm 400, the transaction data may be received into the input nodes of the neural network.

At step 308, the pending transaction is classified by the transaction classifier. In some embodiments, the transaction classifier may classify the transaction as either normal or abnormal based on the transaction data, however, alternative embodiments may be enabled to classify the transaction data according to a normality scale. The normality scale may classify the transaction data between a range of normal and abnormal values as a normality level. In such embodiments, the transaction classifier may use a threshold to determine an action based on the level of normality of the transaction data along the normality scale. In some embodiments, a threat level may be determined by the transaction classifier, wherein the threat level is indicative of the likelihood that the transaction is malicious. In this case, a low threat level may be associated with normal user activity, while a high threat level may be associated with malicious activity.

At step 310, the transaction is allowed if the transaction is classified as normal based on the transaction data. In some embodiments, for example, if the transaction was a first login attempt by a user to the user's account and the transaction data included the user's correct password, along with various other data inputs that match typical data from login attempts of that user and other similar users, the transaction would be classified as normal and the login attempt may be allowed. The user may then have access to resources associated with the user account. In some embodiments, transactions classified as normal are accepted allowing users to move on with the transaction. In some embodiments, the access of the user account to resources may be determined by information received from the authorization database or a privileged access management database.

At step 312, the transaction is mitigated if the transaction is classified as abnormal based on the transaction data. Mitigation of the transaction may be handled in various different ways based on the specific transaction. In some embodiments, the actions to mitigate the transaction may be determined according to a set of mitigation policies enacted by a neural network or by IT security personnel. The mitigation may involve flagging the transaction, blocking an IP address associated with the transaction, or requiring additional authentication, but could include a number of mitigation techniques as will be discussed below.

At step 314, the transaction classifier is updated based on the classification of the transaction and the transaction data. In some embodiments, updating the transaction classifier may involve retraining the artificial neural network algorithm 400 by adjusting the weights between the nodes of the neural network according to the transaction data and transaction classification. In some embodiments, the transaction classifier is updated in real-time as the classification of the transaction is made, so that the transaction classifier is updated according to the transaction data before a subsequent transaction is classified. In some embodiments, IT personnel may override a classification of a particular transaction as normal or abnormal, thereby causing the classifier to be retrained on the updated data including the overridden classification.

At step 316, a security policy may be updated. The security policy may be a mitigation policy. In some embodiments, the mitigation policy is used to determine what mitigation technique is to be used to mitigate a transaction classified as abnormal. Additionally, in some embodiments, the security policy may be used to adjust parameters of the classification algorithm, such as, for example, adjusting a learning rate of the artificial neural network algorithm 400. The mitigation policy may be adjusted respectively for varying types of transactions, so that different types of mitigation techniques are used for specific types of transactions. In addition, the mitigation policy may be monitored, in some cases, by the artificial neural network algorithm 400, to determine the effectiveness of various mitigation techniques. In some embodiments, a mitigation algorithm may be included, that is specifically devoted to developing mitigation policy and optimizing the effectiveness of the mitigation policy. The mitigation algorithm may be distinct from the artificial neural network algorithm 400, be stored at the same location as the artificial neural network algorithm 400, or be a part of the artificial neural network algorithm 400. In some embodiments, the mitigation algorithm may be trained to select the most effective mitigation technique depending on the transaction data and type of transaction. For example, the mitigation algorithm may select a mitigation technique of requiring additional authentication if a user enters a similar password to the correct password of the user's account on the first try. Since, the password attempt is substantially similar to the correct password (i.e., varying by one character) the mitigation algorithm may identify that the user has likely entered a typo, so a mitigation of additional authentication may suffice for the transaction. Further, the mitigation algorithm may be adapted to select the most effective mitigation technique to identify malicious activity based on the transaction data. In some embodiments, the mitigation algorithm may be set up substantially similar to the machine learning algorithm 220, while some other embodiments the mitigation algorithm may be a different type of algorithm. Mitigation technique data may be stored in a mitigation technique database that is accessible to the identity access management database and be used to train, retrain, and update the mitigation policy. In some embodiments, the mitigation policy may not be updated upon every transaction but be updated as needed based on the transaction data and transaction classification.

Some embodiments of the invention may use any combination of a plurality of mitigation techniques used to mitigate abnormal transactions. The combination of mitigation techniques that are used for a given transaction may be determined by the mitigation policy based on the type of transaction, as well as a threat level associated with the transaction. The machine learning algorithm 220, in addition to classifying the transaction, may also determine a threat level for the transaction that is indicative of the likelihood that the transaction is malicious and the degree of risk associated with the specific transaction.

Mitigation techniques may include any combination of flagging a user account, flagging a transaction, preventing a transaction, requiring additional authentication, locking a user account, notifying administration, setting a restricted login attempt rate, resetting login credentials, denying access to a resource, quarantining a user device, quarantining files, quarantining a user account, quarantining a resource of a user account, locking an IP address, removing a user account, updating a security policy, updating a mitigation policy, determining threat level, determining whether transaction data is associated with the Common Vulnerabilities and Exposures (CVE) directory, and other forms of mitigation.

The flagging of accounts and transactions may be carried out in various ways according to the specific embodiment. Some embodiments may flag a transaction, which is then stored in a flagged transaction database. Administration or security personnel may be notified of the flagged transaction and have access to the flagged transaction database. For example, in some embodiments, a flag 226 may be displayed on a user interface of a security administrator, the user interface may be display 116 of computer 102. In addition, some embodiments may be operable to flag transactions and accounts with a plurality of flag types, wherein the type of flag 226 is indicative of the threat level associated with the transaction.

Additional authentication may be required as part of the mitigation process, here the additional authentication may be any form of authentication described herein. The specific form of authentication may be selected by the mitigation policy according to the threat level and type of transaction. For example, abnormal transactions associated with transactions where the user may not be present may require biometric authentication, to prevent access unless the user can present the correct biometric data. In some embodiments, accounts may be locked for a period of time, or indefinitely until administrative action has been taken. In some such embodiments, a lockout time period may be determined by a security policy according to the threat level and type of transaction. Here, the artificial neural network algorithm 400 may use previous iterations of transaction data and training data to optimize the duration of the lockout time. Further, setting a restricted login attempt rate may be enacted to prevent a malicious entity from guessing login credentials of a user account. Setting the restricted login attempt rate may be a desirable technique to restrict non-human entities from logging in because non-human entities may be able to carry out login attempts at a much higher rate than humans.

Depending on the severity of an abnormal transaction, administration may be notified of the transaction. Requesting administrative review may aid administration personnel to spot potential threats and take action before the threats can cause damage or steal information. Resetting login information may be a useful mitigation technique if it has been found that potentially malicious entities have attempted to access a user account. In these situations, a user may be prompted to update login credentials of the user account, such as, for example, a password change. Some mitigation techniques may be as simple as denying the pending transaction, especially when the threat level is low. Quarantining may be used in situations where abnormal transactions could be potentially damaging. For example, if a user account is suspected to contain a harmful virus, the account may be quarantined. Quarantining of the account may involve denying access to the account to edit or view files, access resources, or communicate with other accounts or databases.

In some embodiments, mitigation of the transaction may involve generating a ticket. The ticket may be a transaction ticket used to mitigate high level threats by involving an administrator in the mitigation process. In such embodiments, the high level threats may be threats associated with relatively high potential risk. The transaction tickets may be coded to correspond to certain levels and types of threats and may be displayed in a user interface of an administrator. The administrator may then be notified of the tickets and may use the tickets to identify high level threats. The transaction ticket may include threat information that is indicative of the threat level associated with the transaction.

In some embodiments of the invention, the CVE registry is integrated into the identity access management database. The CVE registry identifies common threats making them more easily detectable. Integration of the CVE registry may be done by storing the CVE registry within the identity access management database or as a separate database and updating the registry periodically, or the identity access management database may access the CVE registry remotely, using network 126, when a potential common threat is suspected.

To ensure that the machine learning algorithm 220 can adapt to various situations, a mitigation technique may be used to check and update the classification of a transaction. For example, if a user logged in to an account and the login transaction was classified as abnormal but was then found to be normal according to further authentication of the user, the system may retrain the machine learning algorithm 220 with the new classification, so that a false positive does not mistrain the machine learning algorithm 220. Additionally, administrative personnel may have access to reclassify past transactions classified as normal that are later found to be abnormal and retrain the algorithm accordingly.

After step 316, the identity access management process 300 may be repeated from step 306 to classify any number of subsequent transactions. For example, a second set of transaction data may be received at step 306, be classified at step 308 using the updated classifier, and used to further update the transaction classifier and mitigation policy at step 314 and step 316 respectively to provide increasingly accurate and comprehensive classifications.

The flow diagram of the identity access management process 300 of FIG. 3 will now be described in operation of an exemplary transaction. The exemplary transaction involves a new user, and an IT professional. The new user is an employee who has just started working for a company of which the IT professional is associated with. The new user does not yet have a user account with the company so the IT professional is tasked with creating a new user account for the user. In this example the transaction classifier has already received the training data 230 from step 302 and been trained using the training data 230 at step 304. The IT professional first inputs login information, using the IT professional's computer, as an attempt to login to a user account associated with the IT professional. Here, the IT professional's computer may be computer 102, as shown in FIG. 1. The login information includes a username, and password. In some embodiments, the login information is user data 240. At step 306, the login information is received as transaction data to the transaction classifier, wherein the transaction is a login attempt. The received transaction data, however, includes various other information. Depending on the specific embodiment and type of transaction, the transaction data may include any combination of username, password, security question, IP address, GPS information, number of login attempts over a period of time, existing flags on the user account, user information, authorization of the account, time of day, response time, biometric information, transaction type, user account information, and other information. Next, at step 308, the transaction classifier uses the transaction data to classify the transaction. Here, the transaction data may be fed to the input nodes of the artificial neural network 400, which based on the weights between the nodes, which has been adjusted through the training process and updated after previous transactions, classifies the transaction. In this example, the transaction classifier classifies the transaction as normal, because the transaction data fell in the normal range (i.e., normal transaction data 222). For instance, the IT professional input the correct username, password, responded in a typical amount of time, and used a computer typically used by that particular IT professional, having a familiar IP address. As such, the transaction is allowed at step 310, and the IT professional is given access to the user account. At step 314, the transaction classifier is updated with the transaction classification and transaction data. In some embodiments, the updating of the transaction classifier may involve updating the weights of a plurality of connections 450 of the artificial neural network 400, as shown in FIG. 4. At step 316, the policy is updated. The policy may be the mitigation policy, which in some embodiments, is used to determine what mitigation technique is used for each transaction.

An additional exemplary transaction of the identity access management process 300 from FIG. 3 will now be described. Following the first example, the IT professional was granted access to the user account, and now wishes to create a new user account for the new user. The IT professional, using the computer, attempts to access a resource of an identity database for creating and managing user account information. The attempt to access the identity database resource is received as a transaction to the transaction classifier. At step 306, the transaction classifier receives transaction data for the pending access transaction. The transaction data includes user account information indicative of the account having administrative access to certain resources. At step 308, the transaction classifier classifies the transaction as normal because the user account has access to the resource and various other inputs of the transaction data match typical normal values of the user, according to past transactions. As such, the transaction is allowed at step 310, allowing the IT professional to create a new user account for the new user. The IT professional enters user information for the new user in order to create the account. The new user is then prompted to setup a password to be used to authenticate the new user, whenever the new user attempts to access the new user account. In some embodiments, the new user may be prompted to enter various other authentication data, which may be stored in the authentication database. For example, the new user may be prompted to provide biometric data, such as, a fingerprint, voice pattern, retinal scan, etc. Alternatively, a badge or keycard may be provided to the new user that is associated with the new user account and can be used to authenticate the user. The badge or keycard may be scanned by a sensor on a user device. At step 314, the transaction classifier is updated with the transaction data and classification to retrain the transaction classifier, this may involve adjusting the weights between the nodes of the neural network. At step 316, the policy is updated according to the transaction data and classification. In this example, the policy may not be updated at all because a policy adjustment is not necessary or the policy may be adjusted slightly to accommodate the new user.

A third exemplary transaction involves a malicious user who seeks to access an accounting database in order to change the malicious user's own salary information. The malicious user is an employee of a company associated with the accounting database. The malicious user has stolen the login information of an accountant also employed by the company. Using the malicious user's home computer, the malicious user attempts to access the accountant's user account with the stolen login information, which includes a username and password. At step 306, the transaction data is received by the transaction classifier, wherein the transaction data includes the username, password, IP address, GPS information of the computer, user account data log, and other information. At step 308 the transaction classifier uses the transaction data to classify the transaction. Since the transaction data includes abnormal information (here, the IP address and GPS information of the accessing computer) the transaction is classified as abnormal. For example, the transaction classifier may have recognized based on the IP address and GPS data that the login attempt was submitted by an unfamiliar computer in an unfamiliar location. Further, the transaction classifier may recognize that the accountant is already logged in to the account and prevent a second simultaneous login. At step 312, the transaction is mitigated because of the abnormal transaction classification. The mitigation may be a mitigation technique that involves requiring multifactor authentication for the account being accessed and a transaction flag 226 placed on the transaction and the account. Furthermore, a notification may be sent to the user account describing the transaction and why it was classified as abnormal. The multifactor authentication may include biometric authentication requiring a fingerprint scan. The malicious user would then, not be able to provide the proper fingerprint of the accountant and the transaction would be further mitigated by denying the login attempt and notifying administration of the company or the companies IT security administration. At step 314, the transaction classifier is updated to retrain the transaction classifier to better recognize malicious sign-in attempts and the specific transaction data associated with similar abnormal transactions. At step 316, the policy is updated. This may involve adjusting the mitigation techniques that are used whenever similar abnormal transactions are identified. Further, the system may log the transaction data along with other abnormal transaction data and the mitigation techniques used to monitor the effectiveness of the mitigation techniques in preventing and identifying malicious users based on abnormal transaction data.

FIG. 4 depicts a diagram representative of an exemplary artificial neural network algorithm 400 that may be used by some embodiments of the invention. The artificial neural network algorithm 400 comprises an input layer 410, a first hidden layer 420, a second hidden layer 430, and an output layer 440. In some embodiments, the artificial neural network algorithm 400 may include different amounts of hidden layers. The input layer 410 comprises a first input node 412, second input node 414, and a third input node 416.

Various embodiments may include varying numbers of input nodes based on the number of items being monitored by the identity access management system. The first hidden layer 420 comprises a first plurality of hidden nodes 422. The number of hidden nodes in the first plurality of hidden nodes may be greater than, equal to, or less than the number of input nodes in the input layer 410. In some embodiments, it may be desirable to have a similar number of hidden nodes as the number of input nodes, alternatively the number of hidden nodes may correspond to the mean number of nodes in the input layer 410 and the output layer 440. Second hidden layer 430 comprises a second plurality of hidden nodes 432. In some embodiments of the invention, the number of hidden nodes in the second hidden layer 430 may be equal to the number of hidden nodes in the first hidden layer 420. The output layer 440 comprises at least one output node 442. In some embodiments, the output node 442 may be a first output node of a plurality of output nodes. The number of output nodes may be selected based on a parameter of the neural network, such as the required number of outputs of the neural network. Each of the layers of the neural network may be connected by a plurality of connections 450, wherein the connections attach each of the nodes of the previous layer to each of the nodes of the subsequent layers, and each of the respective connections of the plurality of connections 450 is associated with a respective weight value of the respective connection. For example, the first input node 412 may be connected to every hidden node of the first plurality of hidden nodes 422 of the first hidden layer 420, as may be the second input node 414, and the third input node 416.

Each directed edge between these nodes is associated with a number called the weight for that edge. The value for an intermediate node is the calculated by summing the product of each node in the previous layer connected to the intermediate node by the weight of the edge connecting them. By adjusting these weight values, each input can be made more or less important in combination with various other inputs based on the weights calculated during the training process.

In some embodiments, the parameters of the artificial neural network algorithm 400 may be stored on the identity access management database 210 as shown in FIG. 2 to allow for easy updating when the algorithm is retrained. Alternatively, in some embodiments, the artificial neural network algorithm 400 may be stored on any other storage component, such as, GPU memory 114, local storage 122, and data store 130.

In a training operation, the artificial neural network algorithm 400 receives a plurality of input values. Each of the respective input values of the plurality of input values is placed in a respective input node of the input layer 410. The artificial neural network algorithm 400 also receives a target output value. Initially the respective weight values of the plurality connections 450 may be symmetrical with an equal weight value at each connection of the plurality of connections 450. During training operation, the weight values of the plurality of connections 450 may be adjusted in order to achieve an output value in output node 442 that is similar to the target output value. The training operation may use a plurality of items of training data 230 including a plurality of input values corresponding to a respective plurality of target output values to adjust the weight values of the plurality of connections so that the artificial neural network algorithm 400 can receive input values and accurately determine a corresponding output value. In some cases, input nodes that have a higher effect on the output node according to the training data 230 may receive an increased weight value to the connections of that input node. For example, if a first input node 412 is configured to receive a value that is indicative of the response time of a user, and the artificial neural network algorithm 400 finds that the value has a high correlation with the output value of output node 442, which in this example, is a value representative of the threat level of a transaction requested by the user. Here, the artificial neural network algorithm 400 finds that an extremely short response time may be indicative of an artificial user attempting to hack a database. Accordingly, the weight values of the connections attached to first input node 412 may be increased, so that an extremely short response time may be associated with a high threat level.

During regular operation, after the initial training of the artificial neural network algorithm 400, the weight values of the plurality of connections 450 are already established. The input nodes receive a plurality of input values associated with a pending transaction. After information travels from the input nodes through the plurality of connections 450 to the first plurality of hidden nodes 422, then through the second plurality of hidden nodes 432 into the output node 442, an output value is calculated according to the received input nodes and the weight values of the plurality of connections 450. The output value may be indicative of a threat level of the pending transaction and is used to classify the transaction. After the transaction is classified, the weight values of the plurality of connections 450 may be updated according to the input values of the transaction data and the classification of the transaction.

Figure 5:
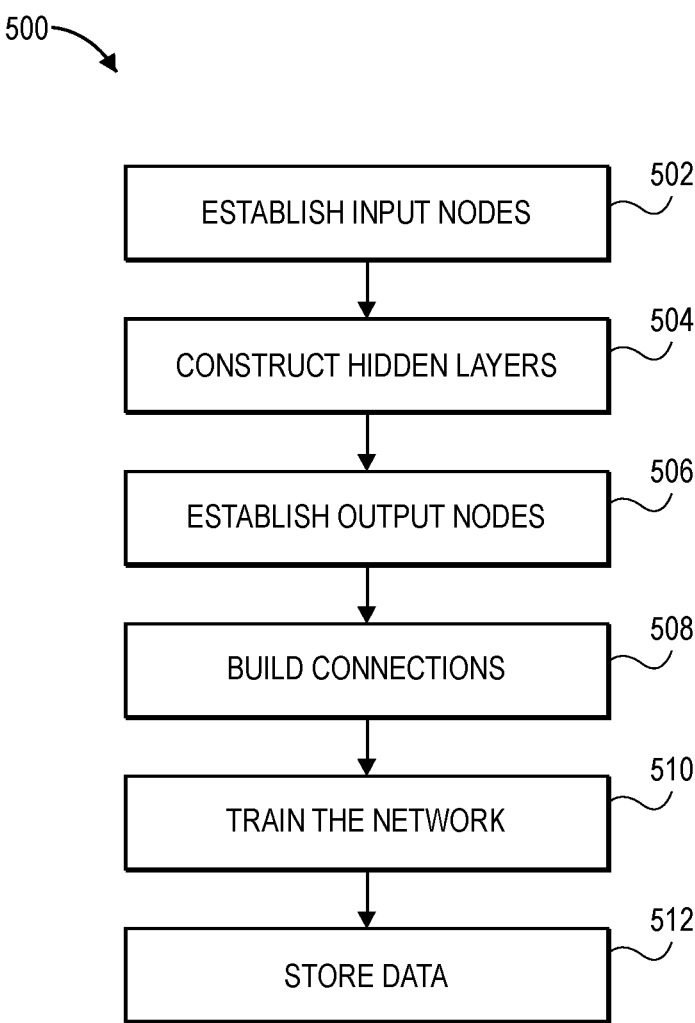
FIG. 5 is an exemplary flow diagram depicting steps to set up a neural network used by some embodiments of the invention.

FIG. 5 shows an exemplary flow diagram of a neural network setup process 500 used by some embodiments of the invention. The neural network setup process 500 may be used to setup the artificial neural network algorithm 400 as shown in FIG. 4 to classify input data.

At step 502, input nodes at the input layer 410 are established based on possible parameters, vulnerabilities, or attack vectors. The number of input nodes may correspond to the number of items being monitored throughout the entire system. The input nodes may be programmed to receive transaction data for a pending transaction or training data inputs.

At step 504, hidden layers are constructed. In some embodiments, the hidden layers constructed at step 504 may include the first hidden layer 420 and the second hidden layer 430 but may include more or fewer hidden layers based on the specific application of the artificial neural network algorithm 400. The hidden layers may comprise varying amounts of hidden nodes based on monitored parameters, threat level, and status. In some embodiments, the nodes may be organized into successive levels, starting with the input node level, then a first hidden node level at first hidden layer 420, a second hidden node level at second hidden layer 430, and eventually the output node level at output layer 440. Varying numbers of hidden node levels may be used by such embodiments.

At step 506, output layer 440 is established. In some embodiments, the output layer contains nodes corresponding to a threat level. The threat level may start at a minimum threat level and go up to a maximum threat level. Accordingly, in some embodiments, the transaction can be classified as one of a plurality of threat levels: no threat, low threat, medium threat, high threat, and maximum threat, as well as other threat levels that may be included in various embodiments. In some embodiments, the threat levels may correspond to numeric values or percentages. For example, the threat level may be given as a percent from 0% to 100% with 0% corresponding to the minimum threat level and 100% corresponding to the maximum threat level. In some embodiments, the mitigation of the transaction may be based at least in part on the threat level of the transaction. For example, a transaction associated with a high threat level may experience a stricter mitigation procedure than a transaction associated with a low threat level.

At step 508, connections 450 are built between the nodes. The connections 450 may be formed between each node on a given level to every node on the next level. The connections 450 may be associated with a weight value. Prior to training the weight values may be initialized to a neutral value, wherein the weight of each connection is similar so that the network is symmetrical before training.

At step 510, the network is trained. Training the network involves inputting training data 230 into the input nodes. The training data 230 also includes target outputs. The weight values of the connections between the nodes are updated so that the target output is reached. After training, the artificial neural network algorithm 400 may be able to receive inputs of transaction data and accurately determine a threat level of a transaction associated with the transaction data.

At step 512, data is stored. The data storage may involve logging user data, storing transaction data, and storing transaction classification data, as well as storing the weight values of the plurality of connections 450.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of threat mitigation for an identity access management system, the method comprising:

receiving transaction data relating to a transaction associated with a user account;

authorizing the user account based at least in part on user information associated with a user;

determining a transaction type of the transaction based on the transaction data;

determining, using a machine learning model, a threat level associated with the transaction based on the transaction data and the transaction type, wherein the machine learning model is trained with training data comprising at least one of user data, access control policy, subject attributes, and environmental attributes;

responsive to determining the threat level, selecting a mitigation procedure from a stored mitigation policy based on the transaction type of the transaction and the threat level associated with the transaction;

applying the mitigation procedure to the transaction based on the transaction type; and storing the transaction data, a first indication of the mitigation procedure, and a second indication of the threat level associated with the transaction in a transaction data store.

2. The method of claim 1, further comprising:

updating the stored mitigation policy based on the transaction data and the transaction type of the transaction.

3. The method of claim 1, further comprising:

accessing at least one of a multifactor authentication database, an identity governance database, and a privileged access management database via a data base communication connection.

4. The method of claim 1, further comprising:

determining one or more normal user values associated with normal user activity, wherein the one or more normal user values are used to classify a normal transaction.

5. The method of claim 4, further comprising:

identifying an abnormality associated with the transaction based on the transaction data using the machine learning model, wherein the abnormality is identified based on a disparity of the transaction with the one or more normal user values of the normal transaction.

6. The method of claim 1, wherein the mitigation procedure comprises locking the user account to prevent access.

7. The method of claim 6, further comprising:

identifying a lockout time period based on the threat level associated with the transaction, the lockout time period indicating a time period for which the user account is locked.

8. The method of claim 1, wherein the mitigation procedure further comprises:

checking a classification of the transaction;

updating the classification of the transaction with a new classification; and retraining the machine learning model with the new classification.

9. A method of threat mitigation for an identity access management system, the method comprising:

receiving transaction data relating to a transaction associated with a user account;

determining a transaction type of the transaction based on the transaction data;

determining, using a machine learning model, a threat level associated with the transaction based on the transaction data and the transaction type, wherein the machine learning model is trained with training data comprising historical user data;

responsive to determining the threat level, selecting a mitigation procedure from a stored mitigation policy based on the transaction type of the transaction and the threat level associated with the transaction;

applying the mitigation procedure to the transaction based on the transaction type; and storing the transaction data, a first indication of the mitigation procedure, and a second indication of the threat level associated with the transaction in a transaction data store.

10. The method of claim 9, further comprising:

authorizing the user account based at least in part on user information associated with a user.

11. The method of claim 10, wherein authorizing the user account comprises a multi-factor authentication procedure using two or more authentication factors to authenticate the user account.

12. The method of claim 11, wherein the two or more authentication factors are selected from a combination of a plurality of factors relating to any of a knowledge of the user, a possession of the user, and an inherence of the user.

13. The method of claim 11, wherein the two or more authentication factors comprise a password of the user and biometric data received from a biometric sensor.

14. The method of claim 9, further comprising:

identifying an abnormality associated with the transaction based on the transaction data using the machine learning model, wherein the abnormality is identified based on a disparity of the transaction with one or more normal user values of a normal transaction.

15. The method of claim 14, wherein the one or more normal user values comprises a normal input pattern.

16. The method of claim 14, wherein the mitigation procedure comprises disabling the transaction based on the abnormality and the threat level associated with the transaction.

17. A method of threat mitigation for an identity access management system, the method comprising:

receiving transaction data relating to a transaction associated with a user account;

determining a transaction type of the transaction based on the transaction data;

determining, using a machine learning model, a threat level associated with the transaction based on the transaction data and the transaction type, wherein the machine learning model is trained with training data comprising at least one of user data, access control policy, subject attributes, and environmental attributes;

responsive to determining the threat level, selecting a mitigation procedure from a stored mitigation policy based on the transaction type of the transaction and the threat level associated with the transaction;

updating the stored mitigation policy based on the transaction data and the transaction type of the transaction; and storing the transaction data, a first indication of the mitigation procedure, and a second indication of the threat level associated with the transaction in a transaction data store.

18. The method of claim 17, wherein the transaction comprises a login attempt to the user account.

19. The method of claim 17, wherein the transaction comprises a request to access a resource by the user account.

20. The method of claim 17, wherein the transaction comprises a data entry from the user account.

* * * * *